Feb. 4, 1941.     W. HEUSSER     2,230,491
CHAIN-POISE VARIABLE-WEIGHT BALANCE
Original Filed Aug. 4, 1934
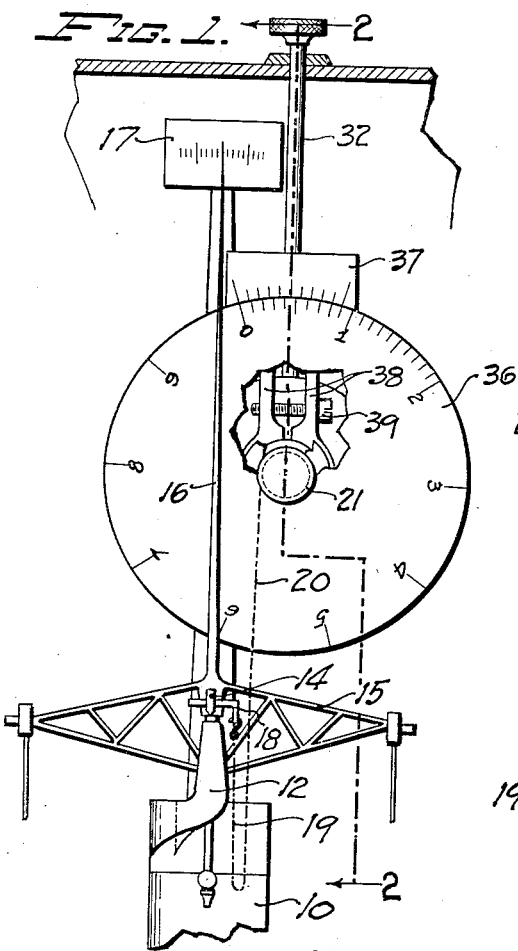
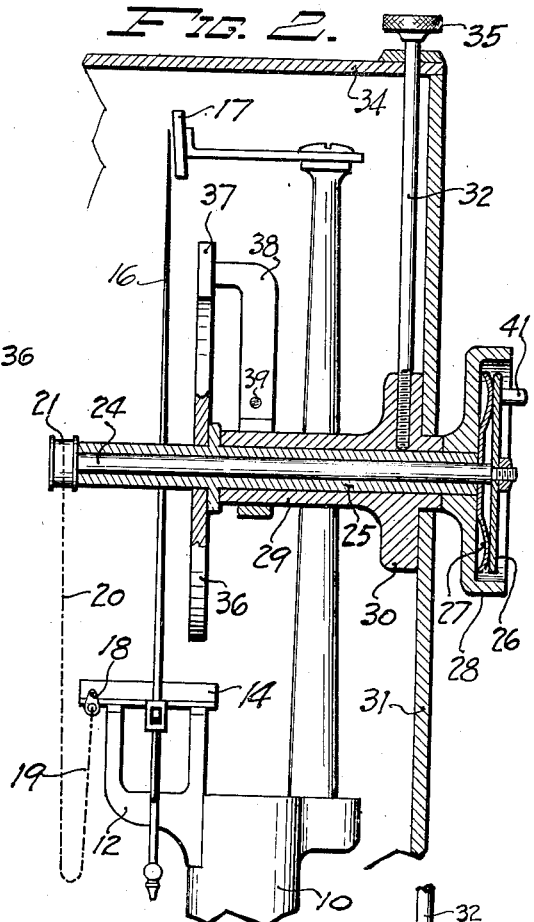
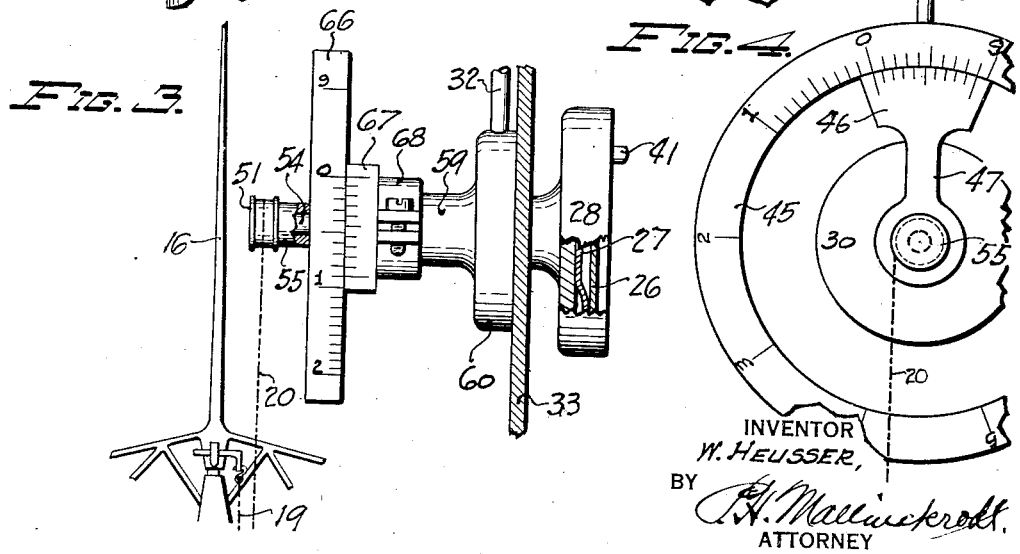
INVENTOR
W. HEUSSER,
BY
ATTORNEY

UNITED STATES PATENT OFFICE 2,230,491

CHAIN-POISE VARIABLE-WEIGHT BALANCE

Wilfrid Heusser, Salt Lake City, Utah

Continuation of application Serial No. 738,488, August 4, 1934. This application February 15, 1939, Serial No. 256,531

16 Claims. (Cl. 265—60)

This invention relates to a chain-poise, variable-weight balance of the type where one portion of the chain-poise is raised or lowered by means of a rotatable member, such as a drum.

The principal objects of the invention are:

First. To greatly simplify the operation of equilibrating a balance, and more particularly a precision balance.

Second. To render weighing operations much more rapid and convenient than has heretofore been possible.

Third. To simplify the balance mechanism, thereby also substantially reducing its cost.

Prior balances in which chains are used as weights are exemplified in my U. S. Patent No. 1,867,008, and in the U. S. patents to Jacobs, No. 1,281,968 and to Gattoni, No. 1,964,349. In the prior devices a suspended weight chain has one end thereof attached to the oscillating system of a balance, and the other end to a rotatable supporting member, both equilibrating and weighing being accomplished by varying the length of the suspended chain. The rotatable chain support is fixed in operative axial relation to a rotatable scale means which registers varying lengths of suspended chain. In aforementioned balances the chain is wound up or unwound as the case may be, by rotating the chain support, and in each prior instance, the scale member, being axially fixed relative to the chain support, is simultaneously and unavoidably rotated. This means that in equilibrating a balance, the scale members must be rotated coextensively with the chain support. Therefore, the initial point of reference on the scale, such as the zero point, seldom comes in the same place, and almost invariably is located out of convenient range of vision of the balance user. In order to keep the initial reference point within convenient limits, the range of rotation of the weight scale must be restricted accordingly. This always involves tedious and time-consuming manipulation of small weights so as to bring the final equilibration by means of the weight chain, within the stated restricted limits.

By means of the invention, the initial reference point of the scale means is located in the proper visual range and remains so permanently. In equilibrating a balance, the movable scale member, which normally is axially fixed relative to the chain support, is set in coincidence with this point and is so held temporarily. Meanwhile, the chain support is loosened from the movable scale member and independently rotated until the desired point of equilibration of the oscillating system of the balance has been effected, at which time the connection between the chain support and the scale member is again rigidly established. Without further fussing the balance is ready for weighing.

The present application is a continuation of one filed by me August 4, 1934, Serial No. 738,488.

In the drawing, which illustrates one desirable embodiment of this invention:

Fig. 1 represents a fragmentary front elevation, partially in section, minor portions being broken away for convenience;

Fig. 2, a side elevation corresponding to Fig. 1, this view being largely in section, taken on the line 2—2 in Fig. 1;

Fig. 3, a fragmentary front elevation, partly in section, showing another construction; and, Fig. 4, a fragmentary front elevation showing still another construction.

Referring to the drawing, the numeral 10 indicates the supporting column of a precision balance. This column may carry a bracket 12, upon which may be supported an edge member 14 forming a rigid part of an oscillating beam 15. The beam may also have a pointer 16 which registers on a stationary equilibrating scale 17, all in the customary manner. The oscillating beam may carry an adjustable auxiliary-edge member 18, from which may be suspended one portion 19 of a poising chain 20, as usual. The free end of the poising chain, instead of being wound on the relatively large indicating wheel, as is the case in the device of the aforementioned patent, is wound on a relatively small rotatable drum 21, this drum being rigidly mounted on a shaft 24, which latter in turn, is yieldably rotatable in a sleeve or quill 25. In order to provide this yieldable rotation, a disk 26 may be fixed on the shaft, and a spring member 27 may be interposed so as to have its reaction between the quill and the disk 26, while an operating wheel 28 fast on the quill, may be a convenience provided for rotating the latter.

The quill may be journaled in a bearing 29, which latter may have a flange or other member 30 for fastening the bearing to a wall, for example, the back wall 31 of a balance casing.

A rod 32, which may have its lower end threaded so as to engage a threaded opening in the stationary member 29, may be provided for clamping the quill in place in its journal. The rod 32 may pass through the top 34 of the balance casing and be provided with a knurled thumbnail 35 within convenient reach of the operator.

Rigidly mounted on the quill, is a member 36, which may be in the form of a wheel having a plane face circumferentially graduated to provide a scale adapted to indicate unit weights corresponding to unit lengths of the chain. In registry with the wheel 36, so as to be conveniently read by the operator, is another graduated scale 37, for example a vernier, which is normally stationary, and which may be supported on an arm 38. The arm 38 may be adjustable angularly with respect to the axis of the wheel 36 and to this end may consist of two branches extending from a split hub adjustably clamped on the outside of the journal hub 29, by means of a screw 39.

In using this device, the operator first sees to it that the quill 25 is freely rotatable in its bearing, which means that the lower extremity of the rod 32 is out of engagement with the quill. The movable indicating scale may then be brought into the proper registry with the stationary indicating scale, by means of the operating wheel 28. In this position, the indicating scale member may be firmly held by screwing down the rod 32. The next step is for the operator to take hold of a small handle 41 fixed in the disk 26, and by means of this handle apply enough force to overcome the friction of spring 27 and to turn the disk in one direction or the other, thereby increasing or diminishing the length of chain portion 19, as the case may require, to bring the oscillating parts of the balance into equilibrium. The rod 32 is now unscrewed sufficiently to release the quill, after which the quill and drum shaft again move as a unit, and the balance is ready for weighing.

In weighing, the chain 20 is raised or lowered by the act of turning the operating wheel 28, since the drum 21 and the operating wheel normally move as one, due to the frictional contact between certain of their associated members, as hereinbefore explained.

In Fig. 2, the operating wheel is shown at the back of the balance casing, but where this arrangement is not convenient, the operating wheel may be placed at the side of the casing, as shown in Fig. 3. In this construction, the drum 51 is disposed substantially in the position that the drum 21, Fig. 1, would occupy if revolved in a horizontal plane through an angle of 90 degrees around the chain 20 as axis.

The quill 55 corresponds to the quill 25; the shaft 54 to the shaft 24, and the bearing 59 to the bearing 29, while the flange 60 is similar to the flange 30. The operating wheel 28 in Fig. 3, has the same appurtenant parts 26, 27 and 41 as are shown in Fig. 2. In the case of Fig. 3, however, the flange 60 is fastened to the side wall 33 of the balance casing, instead of to the back wall 31, as in the case of Fig. 2. Also in Fig. 3, a wheel 66 is used instead of a wheel 36 as in Fig. 1. In the case of wheel 66, a cylindrical face is graduated instead of a plane face. Similarly, the indicating member 67 in Fig. 3 is graduated on the arc face thereof, instead of on one of its plane faces. The indicating member 67 may be provided with a hub 68 clamped on the outside of journal sleeve 59 and be a counterpart of the arm 38 in Fig. 2. The method of using the device of Fig. 3 will be understood from what has already been explained.

In Fig. 4 is shown the possibility of making the weight-indicating scale 45 stationary, and the vernier indicating scale 46 movable. For this purpose, the scale 46 may form part of an arm 47, which is mounted for movement on a quill 55 in a manner similar to that shown in Fig. 2, the only difference being that the arm 47 with its scale replaces the wheel 36.

From this it will be understood that so far as the operation goes, it makes no difference whether the weight scale is movable and the vernier indicating scale stationary, or vice versa.

In general, it may be noted that the drum mounting is concentric with, but separate from, the movable-indicator mounting, and that the operative connection between the two is in the nature of a clutch, preferably a friction clutch. Furthermore, the friction clutch is preferably of a type where there is a yielding or slippage between certain of the clutch parts when a predetermined resistance is overcome. Thus, the movable indicating member normally has motion in unison with the movable member supporting one portion of the chain, but at certain times may have motion independent of the movable chain support.

Since the movable chain support may have a radius much smaller than the radius of the movable indicating member, the relative degree of precision of the balance is increased.

In the present instance the axes of shaft 24 and the quill 25 are not only concentric but are also substantially coextensive with each other, and while this may be preferred, it is not necessarily restrictive.

The friction clutch means may be varied widely, since the parts 26, 27 and 28 are merely illustrative of clutching and declutching means arranged to render the chain-moving means selectively separable from the indicating and registering means, the latter including such parts as scales 36, 37, 45, 46, 66 and 67. The drums or chain supports 21 and 51 act in the capacity of carrier arms and are broadly illustrative of means exerting force moments centered in the axes of any suitable rotative means which in the present instance include the respective shafts 24 and 54, the force moments being the result of the gravity of the suspended chain portion. The weight chain represents any flexible means which has sufficient relaxation to hang freely from its supports.

No claim is made for a weight-chain, a winding drum or indicating means per se, but only as these elements are combined to produce the novel results hereinbefore set forth.

It is to be particularly noted in the Jacobs Patent No. 1,258,009, hereinbefore mentioned, that a weighing-chain drum is frictionally held immovable on a spindle which at the same time carries a rigidly mounted graduated dial, so that it is never possible in a weighing operation to rotate the drum separately from the dial.

For convenience of explanation, the foregoing description refers to specific embodiments of the invention, but any reasonable changes may be made therein without departing from the terms of the following claims.

I claim:

1. A variable-weight balance, including a chain poise, a winding drum for the chain, a shaft on which the winding drum is fast, a quill in which the shaft is rotatable, a bearing in which the quill is rotatable, an indicating member fast on the quill, and means whereby the shaft may be caused to rotate through 360 degrees or more of arc in unison with the quill, and in unlimited independent angular relation thereto.

2. A chain-poise, variable-weight device, including in combination, a chain poise, a drum operable to lift one portion of the chain, a shaft on which said drum is fast, a quill in which said shaft is rotatable, an indicating member fast on the quill and spaced axially apart from the drum, a bearing in which said quill is rotatable, a friction member fast on said shaft, and a spring member adapted to exert the pressure whereby the said shaft shall be caused to rotate in unison with the said quill until a certain frictional resistance is overcome.

3. A chain-poise variable-weight device, including in combination, a rotatable indicating member, a chain weight, a rotatable winding member for the chain weight, a mounting for the rotatable indicating member centered on the axis of the said winding member and a clutch operative between the winding member and the said mounting.

4. A chain-poise variable-weight device, including in combination, a rotatable indicating member having a mounting, a chain mounting in registry therewith, a clutch connecting the chain mounting to the mounting of the rotatable indicating member, a clamp operative to keep the rotatable indicating member temporarily in a locked position, and means whereby motion may be imparted to the chain mounting in the locked position of the mounting of the rotatable indicating member.

5. A chain-poise variable-weight balance, including in combination, an oscillating system having a chain poise, an indicating member operative to actuate said chain poise, a second indicating member with which the first-mentioned indicating member may be brought into a registering position, a lock operable to hold the first-mentioned indicating member in the said registering position, and an equilibrating mechanism operative to equilibrate the said oscillating system while the first-mentioned indicating member is locked; the said lock being operable to release the first-mentioned indicating member from the registering position after the said equilibration has been accomplished.

6. A chain-poise variable-weight balance, including in combination, an oscillating system having a chain-poise, a rotatable drum on which one end of the chain poise is wound, an indicating member normally operable to rotate with the drum, a second indicating member with which the first-mentioned indicating member may be brought into a registering position, means operative to hold the first-mentioned indicating member in the said registering position, and means operative to rotate the said drum while the first-mentioned indicating member is locked, for the purpose of equilibrating the said oscillating system; the said indicating-member-holding-means being operative to cause the release of the first-mentioned indicating member after the said equilibration has been accomplished.

7. A chain-poise variable-weight balance, including in combination, an oscillating system, a chain-poise connected thereto, a normally stationary member having thereon a point of reference, rotatable indicating means having an initial position in registry with the said point of reference, rotatable chain-supporting means in axial alignment with the indicating means, means effective to temporarily hold the indicating means in the said initial registering position, means operative to rotate the chain-supporting means so as to bring the balance into equilibrium while the said indicating means is held in the said initial registering position, and means operative to cause the indicating means and the chain-supporting means to rotate together in fixed angular relation to each other, after the said oscillating system has been brought into equilibrium.

8. A variable-weight balance, including an oscillating system having a chain poise, a rotatable lifting member for the chain, an indicating member mounted for rotation, normally, in fixed unison with said lifting member, a fixed point of reference for the indicating member, and means for maintaining said indicating member stationary in registry with said fixed point of reference while said lifting member rotates during equilibration of the balance.

9. A chain-poise variable-weight balance, including in combination, an oscillating system, a chain having one end thereof attached to the oscillating system and the other end adapted to be raised or lowered, rotatable supporting means for the said other end of the chain, a normally stationary member having a point of reference thereon, indicating means disposed to normally rotate in unison with the said rotatable supporting means, but capable of being temporarily held stationary in registry with the said point of reference, the said rotatable supporting means being meanwhile operable for the purpose of equilibrating the oscillating system, holding means for the said indicating means, and means for causing the indicating means and the rotatable supporting means to again rotate in unison with each other when the equilibrium of the oscillating system is established aforesaid.

10. A chain-poise variable-weight device, including in combination, a rotatable indicating member, a weight-chain mounting disposed in cooperative relation with said indicating member, a friction clutch operatively connecting the weight-chain mounting and said indicating member to each other and being effective normally to insure unison of movement between the two, and means for causing a slip in the friction clutch whereby the weight-chain mounting may be moved independently of said indicating member during equilibration of the balance.

11. A chain-poise variable-weight balance, including in combination, two rotative means concentric with each other, friction clutch means connecting the said rotative means to each other, scale means carried by one of the rotative means, a weighing chain suspended from the other rotative means, and declutching means selectively operative to disconnect the two rotative means from each other.

12. A chain-poise variable-weight balance, including in combination, a weight chain, a chain carrier rotatable to vary the length of the weight chain, a weight indicator normally rotatable together with, but selectively separable from, the chain carrier; and clutch means for selectively effecting the rotation of the weight indicator and the chain carrier relative to each other.

13. A chain-poise variable-weight balance, including in combination, two rotatable means concentric with each other, registering means carried by one of the rotatable means; a weight chain, supporting means for the chain weight carried by the other rotatable means, and friction clutch means selectively operative to cause the two said rotatable means to rotate together or not to rotate together.

14. A chain-poise variable-weight balance in accordance with claim 13 but including the condition where the two rotatable means are not only concentric, but are also axially substantially co-extensive with each other.

15. A chain-poise variable-weight balance, including in combination, two concentric rotatable members, clutch means normally connecting the two said rotatable members to each other, a graduated dial rigidly mounted on one of the rotatable members, registry means fixed relative to the graduated dial, a variable-weight chain having one end thereof suspended so as to exert a force moment upon the other of the rotatable members and means selectively operative upon the clutch means to release the two said rotatable members from each other.

16. A chain-poise variable-weight balance, including in combination, rotatable registering means suitably supported, other rotatable weight-carrying means wherein the flexible-weight exerts a moment centered in the axis of rotation thereof, the two rotatable means being in cooperative proximity to each other, and clutch means having mechanism to selectively connect or disconnect the two rotatable means, relative to each other.

WILFRID HEUSSER.